United States Patent [19]

Sanders, Jr. et al.

[11] Patent Number: 4,975,228

[45] Date of Patent: * Dec. 4, 1990

[54] PROCESS FOR PREPARING MEMBRANES FROM TETRAHALOBISPHENOL POLYCARBONATES

[75] Inventors: Edgar S. Sanders, Jr., Pittsburg; Hawk S. Wan, Antioch; Henry N. Beck, Walnut Creek, all of Calif.

[73] Assignee: The Dow Chemical Company, Midland, Mich.

[*] Notice: The portion of the term of this patent subsequent to Sep. 20, 2005 has been disclaimed.

[21] Appl. No.: 226,348

[22] Filed: Jul. 29, 1988

[51] Int. Cl.$^5$ ............... B01D 69/08; B01D 71/50; D01D 5/247

[52] U.S. Cl. ................. 264/41; 264/558; 264/561; 264/177.14; 264/184; 264/205; 264/209.1; 264/209.3; 264/210.8; 264/211; 264/15; 264/211.16; 210/500.23; 210/500.40

[58] Field of Search ............ 264/41, 558, 561, 184, 264/205, 209.1, 210.8, 562, 211.15, 211.16, 209.3, 177.14; 210/500.23, 500.40

[56] References Cited

U.S. PATENT DOCUMENTS

| | | | |
|---|---|---|---|
| 3,256,675 | 6/1966 | Robb | 55/16 |
| 3,615,024 | 10/1971 | Michaels | 210/500 |
| 3,709,774 | 1/1973 | Kimura | 210/500 |
| 3,945,926 | 3/1976 | Kesting | 264/41 |
| 4,032,309 | 6/1977 | Salerme | 264/41 |
| 4,048,271 | 9/1977 | Kesting | 264/41 |
| 4,075,108 | 2/1978 | Higley et al. | 264/41 |
| 4,086,310 | 4/1978 | Bottenbruch et al. | 264/41 |
| 4,374,891 | 2/1983 | Ward, III | 428/220 |
| 4,772,392 | 9/1988 | Sanders, Jr. et al. | 210/500.23 |

FOREIGN PATENT DOCUMENTS

| | | |
|---|---|---|
| 136621A | 4/1985 | European Pat. Off. . |
| 53-16373 | 2/1978 | Japan . |
| 58-223411A | 6/1982 | Japan . |
| 58-008511 | 1/1983 | Japan . |
| 59-22724 | 2/1984 | Japan . |
| 59-120206 | 7/1984 | Japan . |
| 62-006909 | 6/1985 | Japan . |
| 529183 | 9/1976 | U.S.S.R. . |
| 1507921 | 4/1978 | United Kingdom . |
| 2011804A | 7/1979 | United Kingdom . |

OTHER PUBLICATIONS

Muruganandam, University of Texas at Austin, Separations Research Program, paper presented at fall meeting on Oct. 28 and 29, 1985, "Absorption and Transport in Substituted Polycarbonates and Polystyrene/Tetramethyl Polycarbonate Blends".

Chern et al., Chapter 2 "Material Selection for Membrane Based Gas Separation", i Material Science of Synthetic Membranes, Lloyd, Ed. pp. 25-46, American Chemical Society (1985).

*Primary Examiner*—Hubert C. Lorin

[57] ABSTRACT

A process for the preparation of a membrane comprising bisphenol-based polycabonate wherein at least 25 percent by weight of the bisphenol moieties are tetrahalogenated wherein the halogen is Cl or Br, and the membrane prepared by such process. The process generally comprises: forming a mixture comprising (i) a bisphenol-based polycarbonate wherein at least 25 percent by weight of the bisphenol moieties are tetrahalogeneated, wherein the halogen is Cl or Br, and (ii) a solvent for such polycarbonate, wherein the mixture has a sufficient viscosity to allow extrusion at temperatures at which the mixture is homogeneous; heating the mixture to a temperature at which the mixture is a homogeneous fluid and extrudable, extruding the heated mixture into a shape suitable for membrane use; passing the formed membrane through a quench zone wherein the mixture undergoes phase separation, and the major portion of the solvent is removed from the formed membrane; wherein the membrane formed is a membrane with a discriminating region capable of separating oxygen from nitrogen.

Such membranes have excellent mechanical and thermal properties.

30 Claims, No Drawings

PROCESS FOR PREPARING MEMBRANES FROM TETRAHALOBISPHENOL POLYCARBONATES

BACKGROUND OF THE INVENTION

This invention relates to a process for the preparation of membranes comprising bisphenol polycarbonates wherein at least 25 percent by weight of the bisphenol moieties are tetrahalogenated wherein the halogen is Cl or Br. or a mixture, thereof and to the membranes prepared by the process.

In various industries, it is necessary or highly desirable to separate one component from another in a gaseous stream Processes used to perform such separations include pressure swing absorption, cryogenics, and membrane separations. In a membrane separation, a gaseous stream containing the components to be separated is contacted with a membrane, wherein the membrane separates two regions in a manner such that only those materials which permeate through the membrane can communicate from one region to the other Such membranes are semi-permeable, in that one component of the gaseous mixture selectively permeates through the membrane at a rate much higher than one or more of the components in the gaseous stream. The gaseous mixture is contacted with the membrane in a manner such that the selectively permeable species is preferentially transported through the membrane to the other region It is to be noted that the component from which the selectively permeable species is to be separated may in fact permeate through the membrane at a much slower rate than the selectively permeable species. It is this difference in rates of permeation which is used to separate the gaseous species or reduce the concentration of the less selectively permeated species in the region to which the permeating gases permeate.

In such separations, the relative rate of permeation, that is, the difference in rate of permeation between the selectively permeating gas and the non-selectively permeating gas, is a major factor in the separation achieved The higher the ratio of permeation of the selectively permeable gas over the non-selectively permeable gas, the better the membrane will perform Therefore, it is desirable to have as high a ratio as possible.

Presently, membranes derived from acetate esters, for example cellulose acetate, cellulose diacetate, and cellulose triacetate, polyamides, polyimides, and olefins, for example polyethylene, polypropylene, poly-4-methylpentene-1, are used for gas separations. Among such separations are the separation of oxygen from nitrogen, and carbon dioxide from methane.

Some of the materials used in membranes suffer from certain disadvantages. One such problem is the inability to perform under extreme conditions, such as high temperatures and pressures. As a result, certain separations are limited by the membrane as to the temperatures and pressures which may be used.

Another important property of membranes is the permeability of the gases through the membrane if the permeability is too low, the membrane may not provide enough flow through the membrane to be economical for separations. Potential candidates for membrane separations provide good separation factors but low permeabilities. One technique used to improve the flow is to form asymmetric membranes from such polymers. Asymmetric membranes comprise a membrane with a thin, dense region wherein the separation is effected, and a larger region which is porous through which gases pass with little resistance which provides support for the thin, dense layer. The formation of an asymmetric membrane with good separation factors and permeabilities is a difficult chemistry and engineering problem.

Recently it has been discovered that bisphenol-based polycarbonates wherein at least 25 percent by weight of the bisphenol moieties are tetrahalogenated, wherein the halogen is Cl or Br, exhibit excellent separation factors for the separation of oxygen from nitrogen, but exhibit low flux in the dense form. Furthermore, such polycarbonates exhibit excellent physical properties.

What are needed are membranes of bisphenol-based polycarbonates wherein at least 25 percent by weight of the bisphenol moieties are tetrahalogenated wherein the halogen is Cl or Br wherein the flux is increased significantly over those of a dense membrane of such material. What is further needed is a process which allows the preparation of such membranes from such polycarbonates.

SUMMARY OF THE INVENTION

The invention is a process for the preparation of a membrane comprising bisphenol-based polycarbonate wherein at least 25 percent by weight of the bisphenol moieties are tetrahalogenated wherein the halogen is Cl or Br, and the membrane prepared by such process. The process generally comprises: forming a mixture comprising (i) a bisphenol-based polycarbonate wherein at least 25 percent by weight of the bisphenol moieties are tetrahalogenated, wherein the halogen is Cl or Br, and (ii) a solvent for such polycarbonate, wherein the mixture has a sufficient viscosity to allow extrusion at temperatures at which the mixture is homogeneous; heating the mixture to a temperature at which the mixture is a homogeneous fluid and extrudable; extruding the heated mixture into a shape suitable for membrane use: passing the formed membrane through a quench zone wherein the mixture undergoes phase separation, and the major portion of the solvent is removed from the formed membrane; wherein the membrane formed is a membrane with a discriminating region capable of separating oxygen from nitrogen.

Such membranes have excellent mechanical and thermal properties.

DETAILED DESCRIPTION OF THE INVENTION

More specifically, the invention is a process for preparing a membrane comprising a halogenated bisphenol based polycarbonate which comprises:

(A) forming a mixture comprising (i) a bisphenol polycarbonate wherein at least 25 percent by weight of the bisphenol moieties are tetrahalogenated wherein the halogen is chlorine or bromine; and, (ii) a solvent for the polycarbonate which comprises a glycol ether which corresponds to the formula $R^3O-(CH_2CH_2O)_r-R^3$ wherein $R^3$ is methyl or ethyl, and r is an integer of between about 1 and 20; a dialkyl ketone wherein the alkyl groups independently are methyl or ethyl; morpholine substituted on the nitrogen atom with an alkyl, formyl or alkanoyl moiety: unsubstituted or $N-C_{1-4}$ alkyl, $N-C_{5-6}$ cycloalkyl, or $N-C_{6-10}$ aryl or alkaryl substituted pyrrolidinone; $C_{1-4}$ alkoxycarbonyl, formyl, nitro, or halo substituted benzene: tetrahydrofuran; dimethyl formamide; cyclohexanone; N,N-dimethyl acetamide; acetophenone: caprolactone; methylene chloride: sulfolane; cyclohexyl acetate; 1,1,3,3-tetramethylurea; isophorone; 1-formylpiperidine: methyl salicylate; hexamethylphosphoramide; phenyl ether: or bromonaphthalene:

(B) heating the mixture to a temperature at which the mixture forms a homogeneous fluid and is extrudable;

(C) extruding the heated mixture into a shape suitable for membrane use; and, (D) passing the formed membrane through one or more quench zones wherein the mixture phase separates, and the major portion of the solvent is removed from the formed membrane.

The polycarbonate mixture may be extruded into any shape which is useful as a membrane. Such shapes include flat sheets, hollow tubes, and hollow fibers. The most preferred shape is the hollow fiber shape. The process for preparing this preferred shape may be described as follows. The following description of the process with respect to the formation of hollow fiber membranes refers to one fiber, but the process may be performed on one fiber at a time or a multitude of fibers simultaneously. In fact, most hollow fiber preparation processes involve forming several fibers and processing them simultaneously. The description shall be understood to include forming and processing one fiber or a multitude of fibers simultaneously.

In a preferred embodiment the invention is a process for preparing a hollow fiber comprising a bisphenol polycarbonate which comprises:

(A) forming a mixture comprising
  (i) a bisphenol polycarbonate wherein at least 25 percent by weight of the bisphenol moieties are tetrahalogenated wherein the halogen is chlorine or bromine; and,
  (ii) a solvent for the polycarbonate which comprises a glycol ether which corresponds to the formula R3O-(CH2CH2O)r-R3 wherein R3 is methyl or ethyl, and r is an integer of between about 1 and 20: a dialkyl ketone wherein the alkyl groups independently are methyl or ethyl; morpholine substituted on the nitrogen atom with an alkyl, formyl or alkanoyl moiety: unsubstituted or N—$C_{1-4}$ alkyl, N—$C_{5-6}$ cycloalkyl, or N—$C_{6-10}$ aryl or alkaryl substituted pyrrolidinone; $C_{1-4}$ alkoxycarbonyl, formyl, nitro, or halo substituted benzene; tetrahydrofuran: dimethyl formamide; cyclohexanone; N,N-dimethyl acetamide; acetophenone; caprolactone; methylene chloride; sulfolane; cyclohexyl acetate; 1,1,3,3-tetramethylurea; isophorone: 1-formylpiperidine; methyl salicylate; hexamethylphosphoramide; phenyl ether; or bromonaphthalene; and, wherein the mixture has a sufficient viscosity to allow extrusion at temperatures at which the mixture is homogeneous;

(B) heating the mixture to a temperature at which the mixture forms a homogeneous fluid and is extrudable;

(C) extruding the heated mixture into a hollow fiber form;

(D) passing the formed fiber through one or more quench zones wherein the mixture phase separates, and the major portion of the solvent is removed from the formed fiber, while a core fluid is passed down the hollow core of the fiber under conditions sufficient to prevent the fiber from collapsing.

The membranes prepared by the process of this invention are prepared from polycarbonates derived from bisphenols wherein a significant portion of the bisphenols used to prepare the polycarbonates are tetrahalo-substituted, more preferably the tetrahalo substituents are found in the 3,5-positions on the aromatic or phenolic rings. The presence of a significant portion of the residue of tetrahalo bisphenols enhance the properties of membranes that are prepared therefrom. More particularly, such membranes have enhanced separation factors with respect to oxygen/nitrogen, hydrogen/methane, and carbon dioxide/methane separations.

Preferably, the polycarbonates useful in the process of this invention comprise polymers with backbone units which correspond to the formula

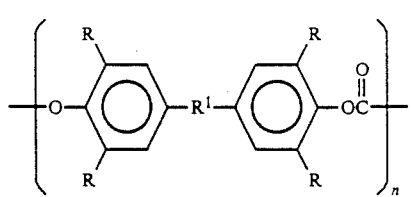

Formula I wherein

R at each occurrence is independently H, Cl, Br, or $C_1$-$C_4$ alkyl; and, $R^1$ is carbonyl, —S—, —$SO_2$, —O—, or a $C_1$-$C_6$ divalent hydrocarbon, a $C_1$-$C_6$ divalent halocarbon radical, or an inertly substituted $C_1$-$C_6$ hydrocarbon radical, with the proviso that at least 25 weight percent of the moieties derived from the bisphenol of Formula 1 present bear R groups which are exclusively Br, Cl, or mixtures thereof, n is positive real number such that the polymer the formula represents has sufficient molecular weight to prepare a membrane with suitable characteristics. Preferably n is 50 or greater.

Preferably, at least 35 weight percent of the bisphenol moieties in the polycarbonate backbone bear R groups which are exclusively bromine, chlorine, or mixtures thereof. More preferably, at least 50 weight percent of the bisphenol moieties in the backbone bear R groups which are exclusively bromine, chlorine, or mixtures thereof. Even more preferably, at least 75 weight percent of the bisphenol moieties in the polycarbonate backbone bear R groups which are exclusively bromine, chlorine, or mixtures thereof. Even more preferably, the polycarbonate is derived from bisphenols where R is exclusively bromine, chlorine, or mixtures thereof. In the embodiment wherein the polycarbonate is prepared from tetrachlorobisphenols, it is preferable that the polycarbonate backbone contain about 90 percent by weight or greater units derived from tetrachlorobisphenols, more preferably 95 percent by weight, and most preferably 100 percent by weight. Bromine is the preferred halogen herein Examples of preferred bisphenols of Formula 1 which bear R groups which are exclusively Br or Cl are 2,2-bis(3,5-bromo-4-hydroxyphenyl)propane and 2,2-bis(3,5-chloro-4-hydroxyphenyl)propane with 2,2-bis(3,5-bromo-4-hydroxyphenyl)propane being most preferred. Preferably, those R groups which are not halogen are methyl or hydrogen, and most preferably hydrogen.

In the hereinbefore presented formulas, R is preferably chlorine, bromine, hydrogen or $C_{1-4}$ alkyl, more preferably chlorine, bromine, hydrogen, or methyl, even more preferably chlorine and bromine, and most preferably bromine. $R^1$ is preferably a $C_{1-6}$ divalent hydrocarbon, more preferably a $C_{1-6}$ alkylidene radical, even more preferably an isopropylidene radical.

The polycarbonates of this invention can be prepared by any process known in the art which prepares polycarbonates with suitable properties for membrane formation. See *Encyclopedia of Polymer Science & Technology*, Editor Mark et al, Interscience Division of John Wiley & Sons, N.Y., N.Y., 1969, Vol. 10, pages 714-725 (relevant portions incorporated herein by reference). The polymers useful in this invention should be polymerized to the extent that the polymers will form a membrane with sufficient mechanical strength to withstand use conditions.

Preferably, the polymer solvent mixture has a viscosity at extrusion temperatures of about 50,000 to about 200,000 poise in the embodiment wherein the core fluid is a gas, and more preferably between about 60,000 and 100,000 poise. Preferably the polymer used to prepare the membranes has a molecular weight ($M_w$) of 100,000 or greater, and more preferably between 100,000 and 300,000.

Preferably the membranes prepared by this invention are asymmetric. "Asymmetric" as used herein refers to a membrane which comprises a thin, dense, discriminating region and one or more porous layers which provide little resistance for the passage of fluids through such porous area to and from the dense discriminating region. Discriminating region refers to a region which functions to separate one or more gases from one or more other gases, and may be a non-porous region or the equivalent of a non-porous region. "Homogeneous fluid" as used herein refers to a fluid which is a mixture of components and which is in one phase. Extrusion refers herein to passing a fluid of the polymer mixture through a die to form the fluid into the desired shape. "Extrudable" as used herein refers to a material which is capable of extrusion to form a desired shape, wherein the material formed to such shape once formed retains such shape. "Quench" as used herein refers to exposing the homogeneous polymer mixture to conditions such that the polymer mixture partially or completely undergoes a phase separation. "Phase separation" refers herein to the phenomena wherein the polymer mixture undergoes separation into a polymer rich phase and a solvent rich phase. "Leaching" as used herein refers to the phenomena wherein entrained solvent is removed from the polymer rich phase.

The polymer mixture, which is extruded to form the membranes by the process of this invention, comprises the polycarbonate described hereinbefore, and a solvent for the polycarbonate. The solvent functions to dissolve the polymer.

The solvent may be any solvent for the polycarbonate, which dissolves enough of the polycarbonate so as to form a solution viscous enough to be extrudable at the extrusion temperatures. The amount of solvent used depends upon the polymer used, the desired properties of the membrane, and the method of quenching the fiber.

The glycol ethers useful as a solvents for the polycarbonate corresponds to the formula $R^3O—(CH_2CH_2O)_r—R^3$ wherein $R^3$ is methyl or ethyl, and r is an integer of between about 1 and 20. Preferably, r is an integer of between about 1 and about 10, and even more preferably between about 1 and about 4, most preferably when methyl r is between about 1 and about 4, and when $R^3$ is ethyl r is between about 2 and about 4. Examples of such glycol ethers include ethylene glycol dimethyl ether, diethylene glycol dimethyl ether, and bis(2-methoxyethyl ether). Preferred dialkyl ketones useful as solvents for the polycarbonates include dimethyl ketone, diethyl ketone, and methyl ethyl ketone. Preferred substituted morpholines are those with a $C_{1-10}$ alkyl, formyl or $C_{1-10}$ alkanoyl moiety substituted on the nitrogen atom; more preferred are those with a $C_{1-4}$ alkyl, formyl or $C_{1-4}$ alkanoyl moiety substituted on the nitrogen atom. Examples of substituted morpholines include N-formylmorpholine, and N-ethylmorpholine. Preferred pyrrolidinones useful as solvents include pyrrolidinone, N-methyl pyrrolidinone, N-ethyl pyrrolidinone, N-cyclohexyl pyrrolidinone, N-benzyl pyrrolidinone, and N-phenyl pyrrolidinone; with N-methyl pyrrolidinone, and N-ethyl pyrrolidinone more preferred; and N-methyl pyrrolidinone most preferred. The term pyrrolidinone as used herein refers to compounds named as pyrrolidinones and pyrrolidones. Preferred substituted benzenes useful as solvents for the polycarbonates correspond to the formula

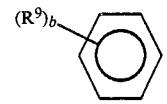

wherein $R^9$ is $C_{1-4}$ alkoxycarbonyl, nitro, halo or a formyl moiety; and b is an integer of about 1 to about 6, with the proviso that wherein $R^9$ is alkoxycarbonyl b is 1. The preferred halogens are chlorine and bromine, with chlorine most preferred. Preferably, b is between about 1 and 3. Examples of substituted benzenes useful as solvents include chlorobenzene, dichlorobenzene, benzaldehyde, nitrobenzene, ethyl benzoate, methyl benzoate, and 1,2,4-trichlorobenzene.

Preferred solvents comprise N-methylpyrrolidinone, tetrahydrofuran, ethylene glycol dimethylether, diethylketone, N-ethylmorpholine, dimethylformamide, cyclohexanone, bis(2-methoxyethylether), N,N-dimethylacetamide, acetophenone, methylene chloride, or sulfolane. More preferred include N-methylpyrrolidinone, ethylene glycol dimethylether, tetrahydrofuran, diethylene glycol dimethylether, acetophenone, methylene chloride, or cyclohexanone. The most preferred solvent is N-methylpyrrolidinone.

The polymer mixture should comprise appropriate amounts of the polymer, and solvent to be extrudable at the extrusion temperatures and to form membranes when processed according to the invention. In particular, the solution should have an acceptable viscosity for such extrusion at extrusion temperatures. The upper limit on the viscosity is that viscosity at which the solution is too viscous to extrude. The lower limit on the viscosity is that viscosity at which the fiber loses its integrity after leaving the vicinity of the extrusion die.

Preferably, the spin composition comprises between 30 and 60 percent by weight of the polymer, and 40 and 70 percent by weight of the solvent. More preferably, the spin composition comprises between 40 and 60 percent by weight of the polymer, and 40 and 60 percent by weight of the solvent. Even more preferably, the spin composition comprises between about 44 and 56 percent by weight of polymer and between about 44 and 56 percent by weight of solvent. Most preferably, the spin composition comprises between 50 and 55 percent by weight of polymer and between about 45 and 50 percent by weight of solvent.

Prior to extrusion, the mixture is heated to a temperature at which the mixture is homogeneous and has an appropriate viscosity for extrusion. The upper limit on the pre-extrusion temperature is that temperature at which the polymer undergoes detrimental degradation in the presence of the particular solvent. Detrimental degradation means herein that the polymer degrades sufficiently that the viscosity of the polymer mixture is significantly lowered below that viscosity at which acceptable membranes can be formed, or the polymer mixture cannot form a membrane which is capable of separating oxygen from nitrogen. In the embodiment wherein the membrane is a hollow fiber and the core fluid is a gas, this is indicated where the hollow fiber collapses in the quench zone. Preferred upper preextrusion temperatures are about 200° C; more preferred upper pre-extrusion temperatures are about 130° C. This upper limit is significantly affected by the kind of extrusion apparatus that is used. Generally, there is a tradeoff between the temperature to which you can raise the composition and the residence time in the heating area. With lower residence times, the polymer mixture can be heated to higher temperatures. The lower limit on the pre-extrusion temperature is that temperature at which the viscosity of the spin solution is sufficiently low enough to allow extrusion. Preferred lower temperatures are 50° C. or above; more preferred lower temperatures are 90° C. or above. Generally, the spin solution is extruded at the temperatures described hereinbefore with respect to the pre-extrusion heating. Provided the temperature of the polymer mixture during extrusion is within the functional limits described hereinbefore, the actual temperature of extrusion can be significantly lower than the pre-extrusion temperature, for example, as much as 20° C. lower.

The polymer is extruded into one or more quench zones. Such zones function to facilitate phase separation of the polymer mixture, removal of a large portion of the solvent, and to provide a zone where the fiber may be drawn to its final diameter. The quench zone may comprise one or more zones. Such zones may be air quench zones, liquid quench zones, or a combination thereof. In one embodiment, the extruded polymer mixture may be extruded into an air quench zone; the extruded polymer mixture may thereafter be passed into one or more liquid quench zones. In another embodiment, the polymer mixture may be extruded directly into a liquid quench zone, and thereafter may be passed into one or more additional liquid quench zones.

In a preferred embodiment, the polymer mixture is extruded into an air quench zone, and thereafter passed into one or more liquid quench zones. In this embodiment, the polymer mixture begins to lose a portion of the solvent due to volatilization and a significant amount of the draw down of the fiber occurs in the air quench zone. Further, the phase separation of the polymer mixture may begin in this zone. The temperature and residence time in the air quench zone should be sufficient such that there is partial removal of the solvent in the zone, the polymer mixture does not undergo complete phase separation in said zone, and the fiber is drawn down to the desired diameter in the zone. If the polymer mixture completely phase separates prior to exiting the air quench zone, a significant amount of solvent may be entrained in the polymer mixture such that it cannot easily be removed from the polymer. The upper limit on the temperature on the air zone is that temperature below which the polymer mixture has sufficient viscosity to retain its shape and integrity. Preferred upper temperatures are about 90° C., with more preferred upper temperatures being about 40° C., and the most preferred upper temperatures being about 25° C. Preferred lower temperatures are about 0° C. or above, with more preferred lower temperatures being about 10° C. or above, and the most preferred lower temperatures being about 20° C. or above. As noted hereinbefore, the temperatures and the residence time are interdependent variables, at cooler temperatures the residence time is shorter while at higher temperatures the residence time is longer so as to achieve the desired results in the air quench zone.

The preferred upper limit of the residence time in the air quench zone is about 10 or less seconds, more preferably 6 seconds or less, and most preferably 1 second or less. The lower residence time is preferably 0.1 second or greater and most preferably 0.25 second or greater. If the environment in the air quench zone is too humid, damage to the extruded shape may occur. Preferably, the humidity at about 24° C. is 60 percent or less. A more preferred humidity range is between about 30 and 60 percent at 24° C. It may be desirable to place a shroud around the air quench zone so as to cut down variability in the shapes due to undesired air currents. In some embodiments, it may be desirable to cool the shroud so as to allow better control of the quenching in the air draw zone. In one embodiment it may be preferred to pass a gentle stream of air in a countercurrent fashion along the shape as it is being extruded.

The speed of extrusion is not critical to the process, provided an acceptable residence time in the quench zones is achieved. Therefore, the line speed may be as fast as the equipment, including the size of the quench zones, allows and which results in acceptable properties in the membranes. Preferably, lower line speeds are 50 feet per minute or above, with about 150 feet per minute or above preferred. Preferably, upper line speeds are 1000 feet per minute or below, with 500 feet per minute or below preferred. In that embodiment where hollow fiber membranes are being formed, a core fluid is preferably passed down the core of the hollow fiber to prevent the fiber from collapsing. The core fluid may be any fluid which prevents the fiber from collapsing and which does not deleteriously affect the membrane properties. The core fluid may be a gas or a liquid, preferably a gas. Preferred core gases may include air, nitrogen, argon, or a gas which enhances the properties of the membrane. The core fluid pressure may be any pressure which prevents the fiber from collapsing and which does not deleteriously affect the membrane properties of the fiber, and is preferably between about 0.1 and 0.5 inch of water, more preferably 0.25 to 0.4 inch of water.

From the air quench zone, the membrane is preferably passed into one or more liquid quench baths. In the liquid quench baths, the membrane completes phase separation and a major portion of the remaining solvent is removed. The liquid quench baths can comprise any liquid which dissolves the solvent and which does not deleteriously affect the membrane properties. Examples of preferred quench liquids include lower alcohols, water, fluorocarbons, lower aliphatic hydrocarbons, or mixtures thereof A most preferred quench bath liquid is water. Optionally, after leaving the first liquid quench bath, the membrane may be passed through or contacted with other liquid baths The conditions of each bath is dependent upon the number of baths used and the conditions of each bath. The conditions of the first liquid quench bath is dependent upon whether other liquid quench baths are used. If only one bath is used, the conditions should be such that the fiber completes its phase separation, and the majority of the solvent is removed from the fiber in the bath. Under such circumstances, a preferred upper temperature is 90° C. or below and 30° C. or below being most preferred. The preferred lower temperature is 0° C. or above, with 20° C. or above being more preferred. The residence time under this condition should be sufficient to allow completion of the phase separation of the fiber and to allow removal of a significant portion of the remaining solvent. The residence time in the single bath can be as long as the economics of the process allow. Such residence times may be as long as no deleterious effects result from such residence times, for example damage from bacterial growth. Residence times of up to several days may be used. Preferably, the upper limit on the residence time is about 30 minutes or lower, more preferably 10 minutes or lower. Preferably, the lower residence time is 2 minutes or greater, more preferably 5 minutes or greater.

In a preferred embodiment, two liquid quench baths are used. In this embodiment, the quench bath temperature and residence time in the first quench bath should be sufficient to result in significant phase separation of the polymer mixture in said zone, and to allow some of the solvent to be removed from the fiber. The lower bath temperature may be the temperature above the freezing point of the bath. Generally the lower the bath temperature the better the bath functions. Where the bath comprises water, the preferred lower temperature is 0° C. or greater The preferred upper temperature is 30° C. or less, more preferably 20° C. or less, and most preferably 10° C. or less. The lower limit on the residence time is preferably .1 second or greater, and more preferably 1.0 second or greater. The upper residence time is preferably 600 seconds or less, more preferably 300 seconds or less, even more preferably 20 seconds or less, and most preferably 2 seconds or less. The second liquid quench bath functions to remove most of the remaining solvent. The conditions of the second liquid quench bath should be such that most of the solvent is removed during its presence in the bath. The temperature of the second liquid quench bath is that temperature which facilitates the removal of the solvent from the membrane The upper temperature is that temperature at which either the bath remains in the liquid form, or the fiber properties are deleteriously affected. The lower limit on temperature is that temperature below which the solvent are no longer removed from the polymer mixture at an acceptable rate. In the most preferred embodiment wherein the bath comprises water, the preferred lower temperatures are 70° C. or above, with a more preferred lower temperature of 80° C. or above. In this embodiment, preferred upper temperatures are 100° C. or below, and more preferred upper temperatures are 90° C. Generally, as the temperature is lowered, the residence time required to achieve the same removal of solvent becomes longer. After the fiber is removed from the one or more quench baths, the fiber preferably contains 1.2 percent or less of the solvent, and more preferably less than .5 percent by weight of the solvent.

In the embodiments wherein one or more liquid quench baths are used, after removal from the first liquid quench bath, the fibers are passed over a set of godets and either passed into another bath or taken up. After completion of the processing, the fibers may be stored in a liquid which does not deleteriously affect the properties of the fibers. The most preferred liquid is water.

In the embodiment wherein the membrane is a hollow fiber, the fiber size is that fiber size which allows good separation of oxygen from nitrogen with reasonable flux, and acceptable pressure drops across the fiber. Preferably, the fiber size is between about 175×117 (outside diameter OD×inside diameter ID) microns to about 100×65 microns and has an OD/ID ratio of about 1.5. Preferably, the fiber has a separation factor for oxygen and nitrogen of 6.0 and greater, more preferably 6.5 or greater, and most preferably 6.8 or greater. Preferably, the fiber has a flux of $1 \times 10^{-8}$ scc/cm$^2$ cmHg sec. or greater, more preferably $1.0 \times 10^{-6}$ scc/cm$^2$ cmHg sec. or greater, and most preferably $1.0 \times 10^{-6}$ scc/cm$^2$ cmHg sec. or greater.

Before fabrication of a module, the membrane is preferably dried. The membrane may be dried by exposing it to the flow of air or an inert gas. Such exposure preferably takes place at a temperature of between about 20° C. and about 80° C. Such gas flow may be a gentle flow either substantially perpendicular to the longitudinal direction of the membrane or along the longitudinal direction of the membrane. In another embodiment wherein the membrane is in the hollow fiber form, the gas may be blown down the core during winding of the module. The gas used to dry the membrane may be any gas which is sufficiently dry to aid in the removal of water from the pores and lumen of the membrane. Such gases include nitrogen, argon, and air.

As used herein, the term semi-permeable membrane refers to a membrane which displays different permeabilities for different species of molecules, and therefore, may be used in the separation of ions and molecules having different permeabilities across the membrane. Permeate as used herein refers to those species which permeate through the membrane at a much faster rate than other species. Non-permeate refers herein to those species which permeate at a much slower rate than the other species present.

Preferably, the membrane exhibits separation properties similar to a dense membrane with a thickness of between about 0.05$\mu$ and 10$\mu$, more preferably between about 0.1$\mu$ and 2$\mu$.

Under certain conditions, it may be highly desirable to provide support to the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the prior art. The membrane affixed to the frame can then be sealingly engaged in the conventional manner in a vessel so that the membrane surface inside the framing support separates two otherwise non-communicating compartments in the vessel. The skilled artisan will recognize that the structure which supports the membrane can be an integral part of the vessel or even the outer edge of the membrane.

The membranes of this invention may be used for separating oxygen from nitrogen by contacting a gaseous stream containing oxygen and nitrogen with the membrane of this invention under conditions such that oxygen selectively permeates through the membrane, in comparison to nitrogen. Preferably, the membrane is sealingly engaged to a vessel which defines a space communicating with only one side of the membrane, such that the permeable oxygen contacting the other side of the membrane can permeate through the membrane to the non-communicating space, at a significantly faster rate than the nitrogen communicates or permeates through the membrane. Preferably, the oxygen and nitrogen are a part of an air stream. Preferably, the pressure on the communicating side of the membrane is between about 40 psia (about 276 kPa) and about 200 psia (about 1378 kPa), more preferably between about 80 (about 551 kPa) and about 120 psia (about 827 kPa). The temperature at which the mixed oxygen and nitrogen stream is contacted with the membrane is preferably between about 0 and 80° C., most preferably between about 0 and 45° C. The pressure differential across the membrane is preferably between about 40 psia (about 276 kPa) and about 200 psia (about 1378 kPa), and more preferably between about 95 (about 655 kPa) and about 120 psia (about 827 kPa).

In one preferred embodiment, the membrane is in a hollow fiber form. In the embodiment wherein the membrane is in hollow fiber form, it is preferable to contact the mixed nitrogen and oxygen stream with a membrane on the inside of the hollow fiber under conditions such that the oxygen selectively permeates out of the hollow fibers and a stream which is rich in oxygen is taken off of shell side of the membrane. This oxygen enriched stream can be further oxygen-enriched by contacting with one or more membranes in succession.

In certain embodiments, the separations of oxygen from nitrogen may be performed at lower temperatures, preferably at about 10° C. or below. It has been discovered that the membranes useful in this invention have surprisingly high separation factors at 10° C. or below. Such separation factors are preferably 8.0 or greater, more preferably 8.5 or greater, and even more preferably 9.0 or greater at 10° C. or below.

SPECIFIC EMBODIMENTS

The following examples are included for illustrative purposes only and do not limit the scope of the claims or the invention. Unless otherwise stated, all parts and percentages are by weight. In each of the examples at least four samples are tested for permeation properties. The flux and separation factor data are reported as an average of all of the samples with a standard deviation. Molecular weights as used herein are weight average molecular weights measured using narrow molecular weight range polystyrene standards.

EXAMPLE 1

A blend of tetrabromobisphenol A polycarbonate (TBBAPC) and N-methylpyrrolidone (NMP) is prepared by adding 50 percent TBBA-PC and 50 percent NMP to a resin kettle. The resin Kettle is equipped with a nitrogen purge, an agitator, and a condenser. With the purge flowing and the agitator stirring, the temperature in the kettle is gradually increased to 120° C. This temperature is maintained until a homogeneous blend is obtained, about 4 hours.

The blend is transferred to the pot of a melt pot extruder. The blend is cooled to approximately 105° C. The spinnerette temperature is controlled at 70° C. A 9 inch airgap (air quench zone) is set between the spinnerette and a liquid quench bath. The liquid quench bath is kept at 4° C.

The mixture is extruded into a hollow fiber form from the spinnerette into the airgap and then into the liquid bath. From the liquid bath the fiber is passed into a second liquid bath at room temperature, and is taken up on a package leesona. The residence time in the airgap is about 0.5 sec. The residence time in the first liquid zone is about 34.2 sec. The residence time in the second liquid zone is about 10 min.

Thereafter the fiber is heated in a water bath at 80° C. for ten minutes. This is followed by extraction in a 50/50 solution of isooctane/isopropanol mixture, for one hour. The fibers are air dried. The fibers are tested for membrane properties as described below, and the results are compiled in Table 1.

PERMEABILITY TESTING PROCEDURE

After the fiber is dried, the fibers are tested for permeation properties. The test device is a pressure vessel with four ports, two tubesheet ports, one feed port through which the compressed gas enters the vessel, and an exit or purge port through which the compressed gas can be purged from the vessel. One hundred twelve (112) fibers are passed into one of the tubesheet ports and out the other allowing for a 31.5 cm length of the fibers to be contained within the test device. Epoxy tubesheets are formed in the two tubesheet ports to give a leak-tight bond between the fiber and the two ports. Test units are then pressurized with nitrogen at 50 psig by allowing compressed nitrogen to enter the test device through the feed port while leaving the exit port closed. The exit port is then opened for two minutes to purge the vessel of air and then closed with pure nitrogen left in the vessel. With the exit port closed and the feed port opened, the gas contained within the test device, by means of a pressure driving force, permeates through the walls of the hollow fibers and passes through the lumen of the fibers and out through the tubesheet ports where the flow rate is measured either by means of bubble or mass flow meters. There is negligible back pressure on the gas exiting the tubesheet. After testing with nitrogen, the feed gas is changed to oxygen and the vessel is purged for about two minutes to give pure oxygen at 50 psig in the test device. The amount of oxygen permeating through the fiber walls is measured by combining the outputs from the two tubesheet ports. From these flow measurements, the gas permeation rates and separation factor can be calculated by use of the following equations.

$$\text{Nitrogen flux} = \frac{\text{Measured flow (sccm)}}{\text{surface area of fiber (cm}^2\text{)} \times \text{pressure (cmHg)} \times 60 \text{ (seconds/minute)}}$$

$$\text{Oxygen flux} = \frac{\text{Measured flow (sccm)}}{\text{surface area of fiber (cm}^2\text{)} \times \text{pressure (cmHg)} \times 60 \text{ (seconds/minute)}}$$

The units are scc/cm$^2$ cmHg sec.
Measured flow = standard cubic centimeters/minute.
Surface area of fibers = 3.14 × OD (outside diameter, cm) × length × the number of fibers.
Pressure (cmHg) = psi × 76/14.7.
The results are compiled in Table 1.
Separation factor is defined as the Oxygen flux divided by the Nitrogen flux.

EXAMPLES 2-5

Fibers are prepared and tested as described in Example 1. The properties are compiled in Table 1.

| Example | Oxygen | Separation Factor | TBBA/NMP RATIO | Relative Thickness |
|---------|--------|-------------------|----------------|--------------------|
| 1 | $2.1 \times 10^{-8}$ | 6.0 | 1:1 | 0.70 |
| 2 | $2.1 \times 10^{-8}$ | 6.4 | 1:1 | 0.70 |
| 3 | $2.4 \times 10^{-8}$ | 6.5 | 1:1 | 0.61 |
| 4 | $3.1 \times 10^{-8}$ | 5.7 | 45:55 | 0.47 |
| 5 | $1.7 \times 10^{-8}$ | 6.4 | 1:1 | 0.86 |

Relative Thickness if the Effective Thickness of the membrane divided by the Actual thickness as calculated by the following formula

EXAMPLE 6

Tetrabromobisphenol A polycarbonate is tested for solubility in several solvents and non-solvents Weighed amounts of polymer and liquid are placed in 4 dram-capacity glass vials with polyethylene-lined caps. About 2.5 grams of liquid is usually used. Initial polymer concentration is about 5 weight percent. The vials are placed on mechanical rollers for at least 24 hours or until complete solution is affected Additional polymer, if indicated, is added to prepare concentrations of about 10, 25, and 50 weight percent. Insoluble mixtures with liquid boiling points in excess of about 100° C. are placed in a 100° C. forced-air oven for at least 24 hours' observation or until solution is completed. The polymer is arbitrarily designated as being "insoluble" in the liquid if 5 weight percent or less dissolved; "moderately" soluble if 5–25 percent dissolved; and "soluble" if more than 25 percent dissolved The results are compiled in Table 2.

TABLE 2
SOLUBILITY OF TETRABROMOBISPHENOL A IN VARIOUS SOLVENTS

| Compound | Relative Solubility* |
|----------|----------------------|
| poly(dimethyl-siloxane) 50 cs. | I < 0.8% b f |
| perfluoro(methyl-cyclohexane) | I < 1.4% b |
| hexane | I < 1.6% b |
| triethylamine | I < 4.7% b |
| butyl stearate | I < 4.9% b f |
| methylcyclohexane | I < 4.6% b f |
| dioctyl phthalate | I < 4.7% b f |
| dodecane | I < 4.7% b f |
| isopropylcyclohexane | I < 4.95% b f |
| t-butylcyclohexane | I < 4.9% b f |
| hexadecane | I < 4.8% b f |
| diisopropyl ketone | I < 4.9% b f |
| cyclohexane | I < 4.8% b |
| bis(2-methoxyethyl ether) | S > 50.3% b |
| ethyl benzoate | S > 25.1 < 50.1% bcg @ f |
| diethylene glycol dibutyl ether | I < 4.9% b f |
| triethyl orthoformate | I < 4.5% b f |
| methyl isobutyl ketone | I < 4.7% b f c |
| tricresyl phosphate | I < 5.0% b > 5.0% f |
| methyl myristate | I < 4.9% b f |
| triethylene glycol dimethylether | S > 50.4% b |
| n-octyl acetate | S > 50.1% b |
| dicyclohexyl | I < 4.8% b f |
| methyl laurate | I < 4.7% b f |
| tetraethylene glycol dimethylether | S > 50.3% b |

TABLE 2-continued
SOLUBILITY OF TETRABROMOBISPHENOL A IN VARIOUS SOLVENTS

| Compound | Relative Solubility* |
|----------|----------------------|
| carbon tetrachloride | I < 4.7% b |
| n-propylbenzene | I < 4.9% b f c |
| methyl stearate | I < 4.7% e f |
| piperidine | S > 26.3% b f d |
| xylene | I < 5.5% bc > 5.5% f |
| decahydronaphthalene (cis & trans) | I < 4.4% b f |
| ethylbenzene | I < 4.9% b f c |
| diethyl ketone | S > 50.2% b |
| toluene | I < 4.5% b f c |
| N-ethylmorpholine | S > 50.1% b |
| cyclohexyl acetate | S > 50.5% b |
| butyraldehyde | I < 4.8% b |
| tetrahydrofuran | S > 51.4% b |
| ethyl acetate | I < 4.7% b c |
| isophorone | S > 25.3 < 50.1b > 50.1f |
| cyclohexylbenzene | I < 4.8% b f |
| trichloroethylene | S > 50.2% b c |
| diacetone alcohol | I < 4.9% b f |
| 1,2,4-trichlorobenzene | S > 25.4 < 50.1bc? > 50f |
| perchloroethylene | I < 4.9% b f |
| chloroform | S > 50.8% b c |
| methyl ethyl ketone | S > 50.1% b c? |
| styrene | I < 4.7% b c |
| ethyl formate | I < 5.0% b c |
| benzaldehyde | S > 50.1% b f |
| tetrahydronaphthalene | I < 4.8% b f |
| chlorobenzene | S > 50.4% b c g @ f |
| methyl acetate | I < 4.8% b c |
| methylene chloride | S > 51.1% b c |
| acetone | I < 4.6% b c |
| cyclohexanone | S > 50.3% b |
| 1-cyclohexyl-2-pyrrolidinone | I < 4.7% b > 4.7% f |
| nitrobenzene | S > 50.3% b c? g @ f |
| p-dioxane | S > 50.1% b |
| o-dichlorobenzene | S > 50.1% b c g @ f |
| epsilon-caprolactone | S > 25.3 < 50.1b > 50.1f |
| phenyl ether | S > 50.1% e f c? @ b |
| methyl formate | I < 5.0% b |
| methyl iodide | S > 50.2 b |
| cyclopentanone | S > 50.3 b |
| hexamethylphosphoramide | I < 4.9% b > 4.9% f |
| methyl benzoate | S > 50.5% b f c? @ b |
| styrene oxide | S > 50.5% b f c? @ b & f |
| 1-ethyl-2-pyrrolidinone | S > 50.1% b |
| acetophenone | S > 50.1% b |
| methyl salicylate | S > 25.6% < 50.1b > 50.1f |
| 1,1,3,3-tetramethylurea | S > 50.3 b c g @ f |
| 1-bromonaphthalene | S > 25.3 < 50.0% bfc? |
| 1-hexanol | I < 4.7% b f |
| dimethyl phthalate | I < 4.9% b > 4.9% f |
| pyridine | S > 50.1% b |
| N,N-dimethylacetamide | S > 50.2% b |
| propionitrile | I < 4.9% b c |
| triethyl phosphate | I < 4.8% bc? d? > 4.8% f |
| dimethyl malonate | I < 4.8% b f |
| polyethylene glycol E400 | I < 2.2% b f |
| 1-acetyl-piperidine | S > 50.1% b |
| 2-furaldehyde | S > 50.1% b |
| N-methyl-pyrrolidinone | S > 50.2% b |
| 1-benzyl-2-pyrrolidone | S > 25.9 < 50.1b > 50.1f |
| 2-propanol | I < 2.9% b |
| 1-formyl- | S > 50.1% b |

TABLE 2-continued

SOLUBILITY OF TETRABROMOBISPHENOL A IN VARIOUS SOLVENTS

| Compound | Relative Solubility* |
|---|---|
| piperidine | |
| diiodomethane | S > 25.2% b f |
| acetonitrile | I < 4.9% b |
| dimethyl-sulfoxide | M = > 14.1% b f c |
| N,N-dimethyl-formamide | S > 55.0% b |
| gamma-butyrolactone | S > 50.2% b |
| ethanol | I < 3.9% b |
| nitromethane | I < 5.0% b f |
| N-formyl-morpholine | S > 25.6 < 50.2b > 50.2f |
| sulfolane | I < 4.6% e > 4.6% f |
| methanol | I < 1.5% b |
| N-methyl-acetamide | I < 4.6% e f |
| 2-pyrrolidinone | S > 25.8 < 50.1b > 50.1f |
| diethyl ether | I < 4.6% b |
| ethylene glycol diethyl ether | I ≦ 5.3 b c |
| ethylene glycol dimethyl ether | S > 51.0% b |
| ethylene carbonate | I < 5.0% e f |
| malonitrile | I < 4.9% e f |
| N-methyl formamide | I < 5.0% b f |

*I = Insoluble: < = 5%, M = Moderately Soluble: 5–25%; S = soluble: >25; b = at room temperature; c = insoluble fraction and/or solvated polymer and/or solvent-induced order ?; d = reacts with polymer; e = at 50° C.; f = at 100° C.; g = clear.

The behavior of about 27 compounds are marked by a "c". Such behavior includes (a) partial dissolution followed by opacification and whitening of the clear swollen polymer accompanied by cessation of further dissolution; this behavior is frequently accompanied by a hazy or cloudy supernatant liquid; (b) dissolution to give a clear solution followed by precipitation at the same temperature of white and opaque solid, mushy gel-like formation, or, at the extreme, a solidification to a "candle wax-like" solid; and (c) dissolution at elevated temperature followed by precipitation of solid, "gelation", and/or a hazy-cloudy formation in the supernatant liquid upon cooling. Seven particularly severe cases of this behavior are noted. Methylene chloride solutions containing about 51% polymer become hard candle wax-like solids after about 17 days' standing at room temperature. DMSO solutions containing about 14 percent polymer are readily formed at room temperature; they change to a white opaque slush after about 36 hours. Redissolution does not occur at elevated temperature. Chloroform solutions containing about 51% polymer are clear at room temperature but changed into candle wax-like solids after about 14 days. Chlorobenzene solutions containing about 50% polymer become clear, stiff gels after about 11 days at room temperature. The gels become clear at 100° C. but become cloudy when cooled. Tetramethylurea containing about 50% polymer is clear and soluble at room temperature but becomes a rigid gel after about 8 days. The gel becomes clear at 100° C.; the clear solution becomes cloudy when cooled to room temperature. A clear solution of about 50% polymer in ethyl benzoate becomes a rigid, opaque gel after 11 days at room temperature. n-Propyl-benzene dissolved less than 4.9% polymer at room temperature; solubility is almost complete at 100° C. The warm solution becomes a candle-like solid when cooled to room temperature.

Table 2 indicates several solvents which are good candidates for spinning polycarbonate membranes by the process disclosed herein.

What is claimed is:

1. A process for preparing a hollow fiber membrane comprising a tetrahalogenated bisphenol polycarbonate which comprises:
   (A) forming a mixture-comprising
       (i) a bisphenol polycarbonate wherein at least 25 percent by weight of the bisphenol moieties are tetrahalogenated wherein the halogen is chlorine or bromine; and,
       (ii) a solvent for the polycarbonate which comprises a glycol ether which corresponds to the formula $R^3O-(CH_2CH_2O)_r-R^3$ wherein $R^3$ is methyl or ethyl, and r is an integer of between about 1 and 20; a dialkyl ketone wherein the alkyl groups independently are methyl or ethyl; morpholine substituted on the nitrogen atom with an alkyl, formyl or alkanoyl moiety: an unsubstituted or N—$C_{1-4}$ alkyl, N—$C_{5-6}$ cycloalkyl, or N—$C_{6-10}$ aryl or alkaryl substituted pyrrolidinone; $C_{1-4}$ alkoxycarbonyl, formyl, nitro, or halo substituted benzene; tetrahydrofuran; dimethylformamide; cyclohexanone: N,N-dimethyl acetamide: acetophenone; methylene chloride; sulfolane: cyclohexyl acetate; 1,1,3,3-tetramethylurea; isophorone; caprolactone; 1-formylpiperidine; methyl salicylate: hexamethylphosphoramide: phenyl ether; or bromonaphthalene;
   wherein the mixture has a sufficient viscosity to allow extrusion at temperatures at which the mixture is homogeneous;
   (B) heating the mixture to a temperature at which the mixture forms a homogeneous fluid and is extrudable;
   (C) extruding the heated mixture into a hollow fiber form: and
   (D) passing the formed fiber through one or more quench zones wherein the mixture phase separates, and the major portion of the solvent is removed from the formed membrane while a core fluid is passed down the hollow core of the fiber under conditions sufficient to prevent the fiber from collapsing:
   wherein the hollow fiber membrane formed has a discriminating region capable of separating oxygen from nitrogen.

2. The process of claim 1 wherein the polycarbonate corresponds to the formula

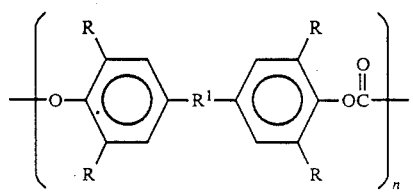

Formula I wherein
R at each occurrence is independently H, Cl, Br, or $C_1-C_4$ alkyl; and,
$R^1$ is carbonyl, —S—, -$SO_2$—, —O—, or a $C_1-C_6$-divalent hydrocarbon, a $C_1-C_6$ divalent halocarbon radical, or an inertly substituted $C_1$–$C_6$ hydrocarbon radical, with the proviso that at least 25 weight percent of the moieties derived from the bisphenol of Formula I present in the discriminating layer bear R groups which are exclusively Br or Cl; n is a positive real number of 50 or greater.

3. The process of claim 2 wherein the fiber is passed from the extruder into an air quench zone, under conditions such that a portion of the solvent is removed from the fibers and the fiber undergoes draw down in said air quench zone, and from the air quench zone the fiber is passed into one or more liquid quench zones under conditions such that the fiber substantially completes phase separation and the solvent is substantially removed from the fiber in said liquid quench zones.

4. The process of claim 3 wherein the fiber is passed through two liquid quench zones wherein the fiber is passed through the first liquid zone under conditions such that the fiber undergoes significant phase separation in said bath, and the fiber is passed through the second liquid bath under conditions such that the solvent is substantially removed from the fiber and the fiber substantially completes phase separation.

5. The process of claim 4 wherein the remainder of the R groups are hydrogen or $C_{1-4}$ alkyl, and $R^1$ is a $C_{1-6}$ divalent hydrocarbon.

6. The process of claim 5 wherein the remainder of the R groups are hydrogen or methyl and $R^1$ is a $C_{1-6}$ alkylidene moiety.

7. The process of claim 6 wherein at least 50 weight percent of the bisphenol moieties present in the discriminating layer bear R groups which are exclusively Br or Cl.

8. The process of claim 7 wherein 100 weight percent of the bisphenol moieties present in the discriminating layer bear R groups which are exclusively Br or Cl.

9. The process of claim 8 wherein at least 50 weight percent of the bisphenol moieties present in the discriminating layer bear R groups which are exclusively Br.

10. The process of claim 9 wherein 100 weight percent of the bisphenol moieties bear R groups which are exclusively bromine.

11. The process of claim 10 wherein the bisphenol is tetrabromobisphenol A.

12. The process of claim 7 wherein the mixture comprises between about 40 and about 60 percent by weight of polycarbonate and between about 40 and about 60 percent by weight of solvent.

13. The process of claim 12 wherein the solvent for the polycarbonate is N-methyl pyrrolidinone, tetrahydrofuran, ethylene glycol dimethyl ether, diethyl ketone, N-ethyl morpholine, dimethyl formamide, cyclohexanone, bis(2-methoxyethyl ether), N,N-dimethyl acetamide, acetophenone, methylene chloride, sulfolane, or mixtures thereof.

14. The process of claim 13 wherein the solvent is N-methyl pyrrolidone, ethylene glycol dimethyl ether, tetrahydrofuran, diethylene glycol dimethyl ether, acetophenone, or methylene chloride.

15. The process of claim 14 wherein the solvent is N-methyl pyrrolidone.

16. The process of claim 13 wherein the mixture is heated prior to extrusion to a temperature of between about 50 and 200° C. and the mixture is extruded at a temperature of between about 50 and 200° C.

17. The process of claim 16 wherein the fiber is contacted with the first liquid quench zone which comprises water at a temperature of between about 0 and about 30° C. and the second liquid quench zone which comprises water at a temperature of between about 70 and about 100° C.

18. The process of claim 17 wherein the residence time of the fiber in the air quench zone is between about 0.25 and about 1 second, in the first liquid quench zone is between about 0.1 and about 600 seconds, and in the second liquid quench zone is between about 1 and about 30 minutes.

19. The process of claim 18 wherein the fiber after removal from the second liquid quench zone contains less than about 1.5 percent by weight of solvent.

20. The process of claim 19 wherein the fiber has a separation factor of 6.0 or greater for oxygen and nitrogen at 24° C.

21. A process for preparing a membrane comprising tetrahalogenated bisphenol polycarbonate which comprises:

(A) forming a mixture comprising
  (i) a bisphenol polycarbonate wherein at least 25 percent by weight of the bisphenol moieties are tetrahalogenated wherein the halogen is chlorine or bromine: and,
  (ii) a solvent for the polycarbonate which comprises a glycol ether which corresponds to the formula $R^3O$—$(CH_2CH_2O)_r$—$R^3$ wherein $R^3$ is methyl or ethyl, and r is an integer of between about 1 and 20; a dialkyl ketone wherein the alkyl groups independently are methyl or ethyl; morpholine substituted on the nitrogen atom with an alkyl, formyl or alkanoyl moiety: unsubstituted or N—$C_{1-4}$ alkyl, N—$C_{5-6}$ cycloalkyl, or N—$C_{6-10}$ aryl or alkaryl substituted pyrrolidinone; $C_{1-4}$ alkoxycarbonyl, formyl, nitro, or halo substituted benzene; tetrahydrofuran; dimethyl formamide; cyclohexanone; N,N-dimethyl acetamide; acetophenone; methylene chloride; sulfolane; cyclohexyl acetate; 1,1,3,3-tetramethylurea; isophorone; caprolactone: 1-formylpiperidine; methyl salicylate; hexamethylphosphoramide; phenyl ether; or bromonaphthalene;

(B) heating the mixture to a temperature at which the mixture is a homogeneous fluid and extrudable;

(C) extruding the heated mixture into a shape suitable for membrane use:

(D) passing the formed membrane through one or more quench zones wherein the mixture phase separates, and the major portion of the solvent is removed from the formed membrane: and wherein the membrane formed has a discriminating region capable of separating oxygen from nitrogen.

22. The process of claim 21 wherein the mixture is passed from the extruder into an air quench zone, under conditions such that a portion of the solvent is removed from the mixture, and from the air quench zone the mixture is passed into one or more liquid quench zones under conditions such that the membrane substantially completes phase separation and the solvent is substantially removed from the mixture in said liquid quench zones.

23. The process of claim 22 wherein the mixture is passed through two liquid quench zones wherein the mixture is passed through the first liquid zone under conditions such that the mixture undergoes significant phase separation in said bath, and the membrane is passed through the second liquid bath under conditions such that the solvent is substantially removed from the mixture and phase separation is substantially completed.

24. The process of claim 23 wherein the membrane shape is a hollow tube, a sheet, or a hollow fiber.

25. The process of claim 24 wherein the polycarbonate corresponds to the formula

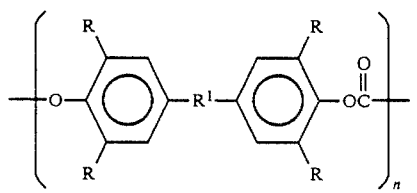

Formula I wherein

R at each occurrence is independently H, Cl, Br, or $C_1$—$C_4$ alkyl; and $R^1$ is carbonyl, —S—, —$SO_2$—, —O—, or a $C_1$—$C_6$ divalent hydrocarbon, a $C_1$—$C_6$ divalent halocarbon radical, or an inertly substituted $C_1$—$C_6$ hydrocarbon radical, with the proviso that at least 25 weight percent of the moieties derived from the bisphenol of Formula I present in the discriminating layer bear R groups which are exclusively Br or Cl.

26. The process of claim 25 wherein 100 weight percent of the bisphenol moieties present in the discriminating layer bear R groups which are exclusively Br or Cl.

27. The process of claim 26 wherein at least 50 weight percent of the bisphenol moieties present in the discriminating layer bear R groups which are exclusively Br.

28. The process of claim 27 wherein the bisphenol is tetrabromobisphenol A.

29. The process of claim 28 wherein the solvent is N-methyl pyrrolidone, ethylene glycol dimethyl ether, tetrahydrofuran, diethylene glycol dimethyl ether, acetophenone, methylene chloride, or cyclohexanone 30. A process for preparing hollow fiber membrane comprising tetrabromobisphenol A polycarbonate which comprises:
(A) forming a mixture which comprises between about 40 and 60 percent by weight of
 (i) tetrabromobisphenol A polycarbonate; and
 (ii) between about 40 and 60 percent by weight of N-methyl pyrrolidone;
wherein the mixture has a sufficient viscosity to allow extrusion at temperatures at which the mixture is homogeneous:
(B) heating the mixture to a temperature of between about 50 and about 200° C. at which temperature the mixture is a homogeneous fluid and extrudable;
(C) extruding the heated mixture into a hollow fiber form at a temperature of between about 50 and about 200° C.:
(D) passing the formed fiber through an air quench zone wherein the fiber loses a portion of the solvent, while a core fluid is passed down the hollow core of the fiber under conditions sufficient to prevent the fiber from collapsing, wherein the residence time of the fiber in the air quench zone is between about 0.25 and about 1.0 seconds:
(E) passing the fiber into a first water quench zone at a temperature of between about 0 and 30° C. for a period of between about 0.1 and about 600 seconds wherein the mixture undergoes significant phase separation, and the major portion of the N-methyl pyrrolidone is removed from the formed fiber; and
(F) passing the fiber into a second water quench zone at a temperature of between about 70 and 100° C. for a period of between about 2 and about 30 minutes, wherein a majority of the remaining N-methylpyrrolidone is removed and the phase separation is substantially completed; wherein the hollow fiber formed is an asymmetric fiber with a discriminating region capable of separating oxygen from nitrogen with a separation factor of 6.0 or greater.

* * * * *